United States Patent
Horie et al.

(10) Patent No.: US 10,387,229 B2
(45) Date of Patent: Aug. 20, 2019

(54) REDUCING COST OF DESERIALIZATION BY SKIPPING UNUSED ARRAY REGIONS

(71) Applicant: INTERNATIONAL BUISNESS MACHINES CORPORATION, Armonk, NY (US)

(72) Inventors: Michihiro Horie, Saitama (JP); Kiyokuni Kawachiya, Kanagawa (JP); Mikio Takeuchi, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 737 days.

(21) Appl. No.: 14/949,667

(22) Filed: Nov. 23, 2015

(65) Prior Publication Data
US 2017/0147221 A1    May 25, 2017

(51) Int. Cl.
*G06F 3/06* (2006.01)
*G06F 9/54* (2006.01)

(52) U.S. Cl.
CPC .................... *G06F 9/547* (2013.01)

(58) Field of Classification Search
CPC ........................................ G06F 9/547
USPC ........................................ 717/151
See application file for complete search history.

(56) References Cited

U.S. PATENT DOCUMENTS

| | | | |
|---|---|---|---|
| 8,667,507 B2 * | 3/2014 | Kalagananam | G06F 9/45504 717/166 |
| 8,990,791 B2 | 3/2015 | Derisavi et al. | |
| 9,389,890 B2 * | 7/2016 | Hamby | G06F 8/41 |
| 2012/0042325 A1 * | 2/2012 | Inglis | G06F 9/547 719/316 |
| 2012/0158817 A1 * | 6/2012 | Lauderdale | G06F 9/46 709/201 |
| 2016/0092205 A1 * | 3/2016 | Seovic | G06F 8/71 717/170 |

OTHER PUBLICATIONS

Zhang et al., "Minimizing Downtime in Seamless Migrations . . . ", 2006, ACM, pp. 12-21.*
Tajchman, Marc., "Parallelization Using a PGAS Language such as X10 in HYDRO and TRITON", Partnership for Advanced Computing in Europe, Feb. 2013, 7 Pages.

* cited by examiner

*Primary Examiner* — John Q Chavis
(74) *Attorney, Agent, or Firm* — Tutunjian & Bitetto, P.C.; Vazken Alexanian

(57) ABSTRACT

Methods are provided for copying, from a local place to a remote place, only array variables from a set at the local place that are used at the remote place. A method includes identifying the array based on the array meeting a condition of being defined outside of a code block for a copy command and used inside of the code block. The copy command mandates a copying of all the array variables in the set from the local place to the remote place. The method includes generating a function having code that selectively serializes or deserializes only the array variables from the set that are used at the remote place. The method includes serializing, at the local place, and deserializing at the remote place, only the array variables from the set that are used at the remote place, by invoking the function.

20 Claims, 6 Drawing Sheets

```
val particles = new Rail[Long](Place.numPlaces() * SIZE, 1);

void calc() {
  for (pl in Place.places()) {
    async {
      at (p) {
        var sum : Long = 0;
        for (var i : Long = 0; i < SIZE; ++i) {
          sum += particles(SIZE * pl.id + i);
        }
        print("place " + pl.id + ", sum=" + sum);
```

```
void calc() {
    ... runAt(...) ...
} final public static class Closure$0 implements X10JavaSerializable ... {
    public void $_serialize(X10JavaSerializer $serializer) ... {
        serialize_sparse(this.particles);
    }
    public static X10JavaSerializable $_deserialize_body(Closure$0 $_obj,
        X10JavaDeserializer $deserializer) ... {
        deserialize_sparse(this.particles);
    }
}
```

FIG. 4

REDUCING COST OF DESERIALIZATION BY SKIPPING UNUSED ARRAY REGIONS

BACKGROUND

Technical Field

The present invention relates generally to information processing and, in particular, to reducing the cost of deserialization by skipping unused array regions.

Description of the Related Art

In the X10 programming language (hereinafter "X10"), an X10 "place" is a repository for data and activities, corresponding loosely to a process or a processor. Places induce a concept of "local". The activities running in a place may access data items located at that place with the efficiency of on-chip access. On the other hand, accesses to remote places may take orders of magnitude longer.

In X10, objects cannot be referred to directly from other remote places. Instead, if an object is used in a remote place, the object is copied before being used in the remote place. The at statement in X10 allows for implicitly copying of objects.

For example, for the statement "at(p) {S}", the data that is defined outside of at and that is used in S (that is, to execute S) is copied to a remote place p.

The data just before the at body is executed is copied to a remote place. To realize this feature, when the X10 compiler converts X10 code to Java/C++ code, at is converted to a method invocation of runAt, and the data that will be copied to a remote place is given as the arguments of the runAt method.

If a data array is used in a remote place, all of the elements in the array are copied even if only part of the array elements are actually used in the remote place. All of the array elements are copied because it is not clear which array elements will be used in a remote place before copying of the array takes place.

Thus, at the local place, it has to be determined which array elements are to be used in the remote place. Accordingly, there is a need to change the semantics of copying data in X10 and similarly operating programming languages in order to enable only the array data that is to be used at a remote place to ultimately be copied to the remote place, thus reducing deserialization at the remote place.

SUMMARY

According to an aspect of the present principles, a method is provided. The method is for copying, from a local place to a remote place in a Partitioned Global Address Space language model, only array variables from a set at the local place that are used at the remote place. The method includes identifying the array based on the array meeting a condition of being defined outside of a code block for a copy command and used inside of the code block for the copy command. The copy command mandates a copying of all the array variables in the set from the local place to the remote place. The method further includes generating a function having code that selectively serializes or deserializes only the array variables from the set that are used at the remote place. The method also includes serializing, at the local place, only the array variables from the set that are used at the remote place, by invoking the generated function. The method additionally includes deserializing, at the remote place, only the array variables from the set that are used at the remote place, by invoking the generated function.

According to another aspect of the present principles, a computer program product is provided. The computer program product is for copying, from a local place to a remote place in a Partitioned Global Address Space language model, only array variables from a set at the local place that are used at the remote place. The computer program product includes a non-transitory computer readable storage medium having program instructions embodied therewith. The program instructions are executable by a computer to cause the computer to perform a method. The method includes identifying the array based on the array meeting a condition of being defined outside of a code block for a copy command and used inside of the code block for the copy command. The copy command mandates a copying of all the array variables in the set from the local place to the remote place. The method further includes generating a function having code that selectively serializes or deserializes only the array variables from the set that are used at the remote place. The method also includes serializing, at the local place, only the array variables from the set that are used at the remote place, by invoking the generated function. The method additionally includes deserializing, at the remote place, only the array variables from the set that are used at the remote place, by invoking the generated function.

According to yet another aspect of the present principles, a method is provided. The method is for copying, from a local place to a remote place in a Partitioned Global Address Space language model, only array variables from a set at the local place that are used at the remote place. The method includes identifying the array based on the array meeting a condition of being defined outside of a code block for a copy command and used inside of the code block for the copy command. The copy command mandates a copying of all the array variables in the set from the local place to the remote place. The method further includes for each of the array variables, extracting index expressions therefor, and generating a function having code that modularizes the index expressions and serializes and deserializes the array variables. The method also includes obtaining a list that includes the array variables that are copied by the code block for the copy command. The method additionally includes checking that each of the array variables used in the index expressions is included in the list or is side-effect free. The method further includes rewriting the index expression to align with remote place contexts responsive to each of the arrays variables used in the index expressions being included in the list or being side-effect free. The method also includes serializing, at the local place, only the array variables from the set that are used at the remote place, by invoking the generated function. The method additionally includes deserializing, at the remote place, only the array variables from the set that are used at the remote place, by invoking the generated function.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 shows exemplary code 300 to be processed in accordance with method 200 of FIG. 2, in accordance with an embodiment of the present principles;

FIG. 4 shows a compiled version 400 of the exemplary code 300 of FIG. 3 using an X10 compiler, in accordance with an embodiment of the present principles;

DETAILED DESCRIPTION OF PREFERRED EMBODIMENTS

The present principles are directed to reducing the cost of deserialization by skipping unused array regions. Deserialization refers to the process of extracting a data structure from, for example, a series of bytes. It is to be appreciated that the present principles can be used with respect to the X10 programming language or any other similarly functioning programming language such as, for example, programming languages involving a Partitioned Global Address Space (PGAS) language model.

Advantageously, the present principles enable copying of just the array elements that are actually used in a remote place, as opposed to all of the array elements including elements that are not actually used in the remote place. To achieve this feature, in an embodiment, the index expression of arrays calculated at the local place has the same values as the result of calculating the index expression in a remote place(s).

As an example, the index expression of an array access "r(i+1)" is "i+1". If obtaining the same values between the local place and remote places is ensured, then just a portion of the array elements are serialized in the local place, and deserialized in the remote place(s).

Thus, in an embodiment, the calculation of the index expression of arrays at the local place is checked to ensure that the same values are obtained for a calculation of the index expression of arrays at a remote place(s). That is, the same variable names have the same values at both the local place and the remote place(s). If a discrepancy exists, then the index expression is rewritten as needed so that the values match at the local place and the remote place(s). Then, advantageously, just a portion of the array elements are transferred at runtime by using the index expression.

It is to be appreciated that the present principles can relate to a local place and one or more remote places.

Figure 1:
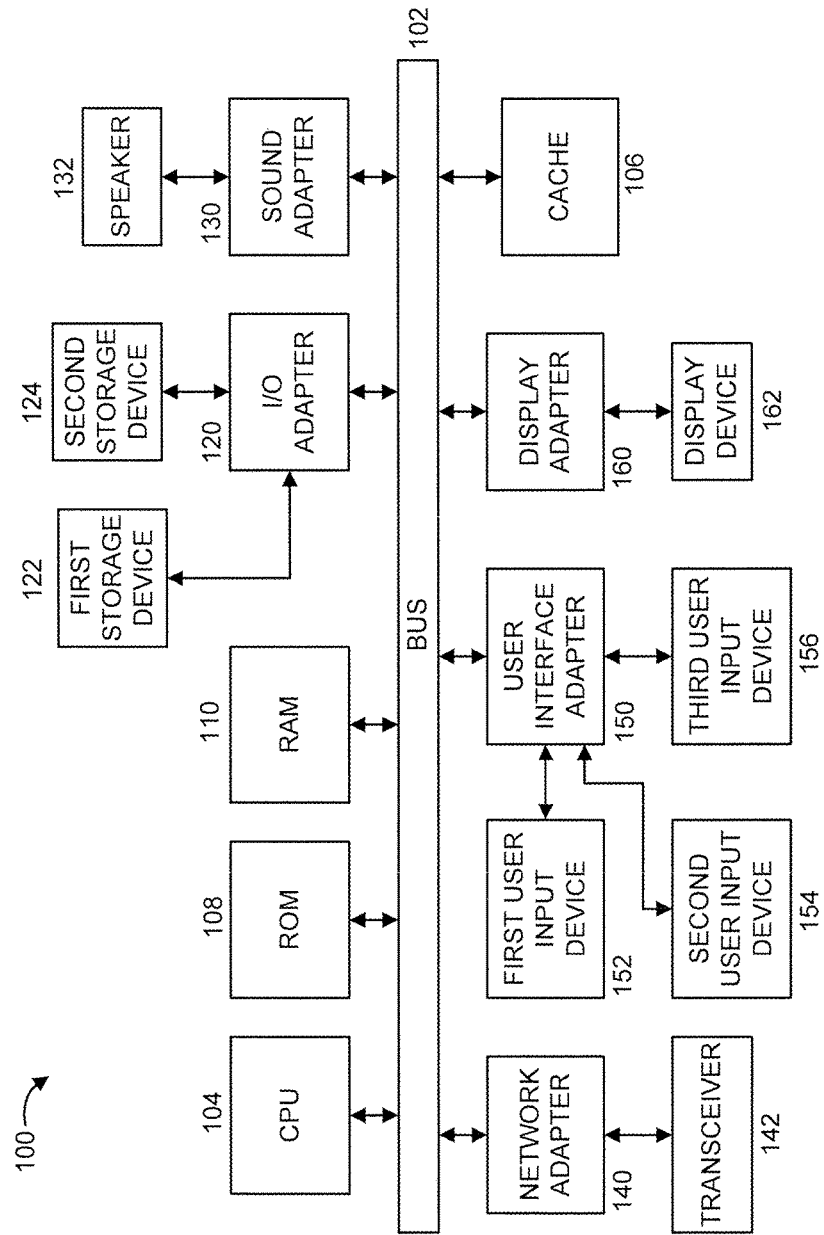
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
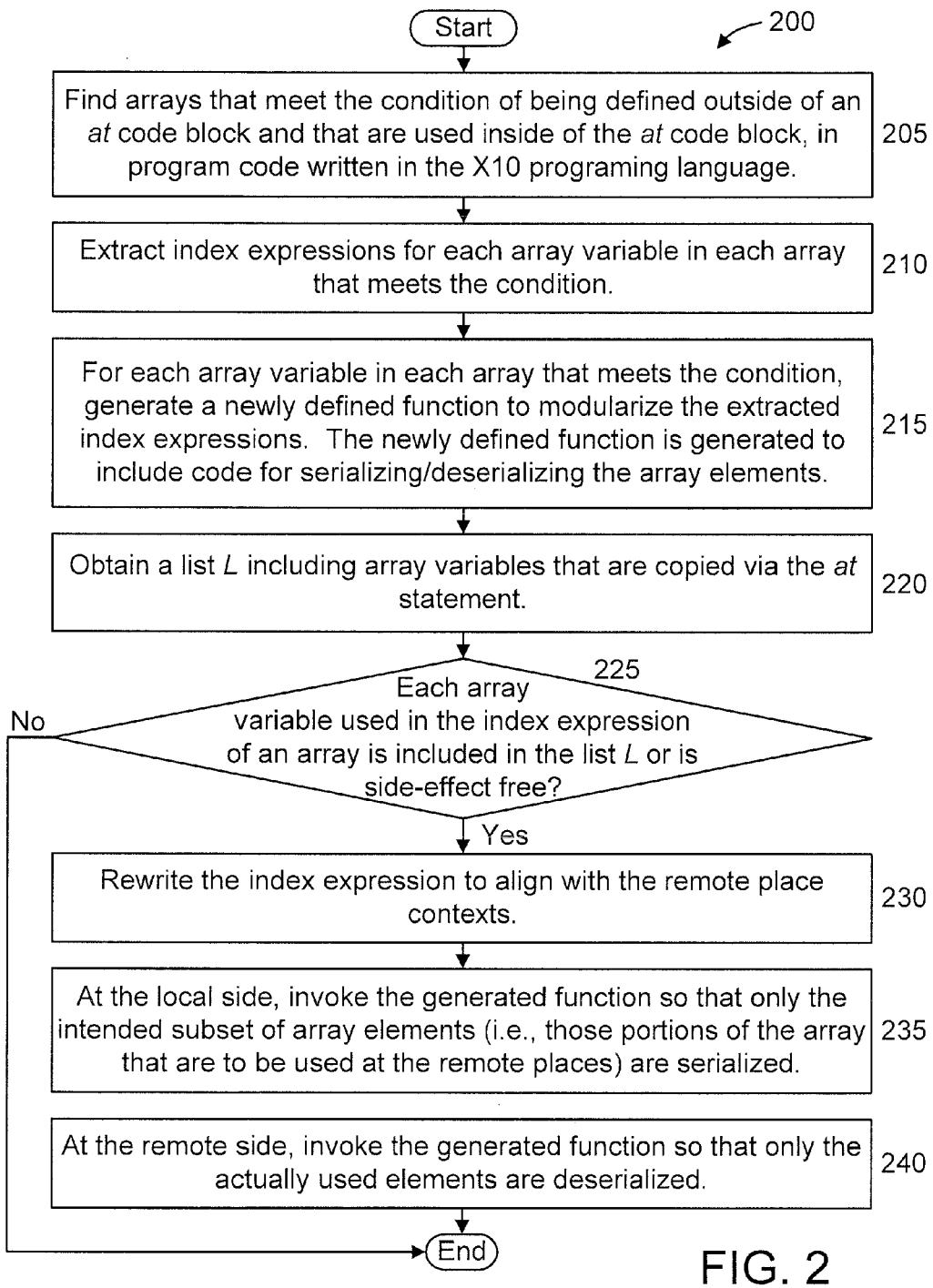
FIG. 2 shows an exemplary method 200 for reducing the cost of deserialization by skipping unused array regions, in accordance with an embodiment of the present principles.

It is to be appreciated that processing system 100 may perform at least part of the method described herein including, for example, at least part of method 200 of FIG. 2.

FIG. 2 shows an exemplary method 200 for reducing the cost of deserialization by skipping unused array regions, in accordance with an embodiment of the present principles.

At step 205, find arrays that meet the condition of being defined outside of an at code block and that are used inside of the at code block, in program code written in the X10 programing language. The at code block can be considered a code block for a copy command that mandates copying all the array variables in a set of array variables corresponding to an array, from the local place to the remote place and, thus, includes array variables that are not even used at the remote place.

At step 210, extract index expressions for each array variable in each array that meets the condition.

At step 215, for each array variable in each array that meets the condition, generate a newly defined function to modularize the extracted index expressions. The newly defined function is generated to include code for serializing/deserializing the array elements. Exemplary code is shown herein below with respect to FIGS. 3-6. The newly defined function can be invoked, for example, at an optimization step(s) described hereinafter in order to serialize/deserialize a portion of the array elements.

At step 220, obtain a list L including array variables that are copied via the at statement.

At step 225, determine whether or not each of the array variables used in the index expression of an array is included in the list L or is side-effect free. If so (i.e., included in list L or side-effect free), then the method proceeds to step 230. Otherwise, the method is terminated.

Regarding step 225, an array variable is side-effect free if (1) there is no input/output (IO) operation for the array variable, or (2) the array variable is declared as a field and there is no store operation to this variable.

At step 230, rewrite the index expression to align with the remote place contexts (that is, the index expressions at a remote place(s)).

In an embodiment, step 230 may involve converting the value of the term "here" to the corresponding id (identifier) that is given for each remote place. The term "here" is a special term in X10 to represent the local place.

In an embodiment, step 230 may involve surrounding the index expression with a try-catch statement, which is a form of an exception handler/resolver. A single exception should not be thrown during the serialization/deserialization since no exceptions can occur in the original behavior of X10's serialization/deserialization. Potentially, there can be two types of exception that can be thrown. One type of exception can result from calculating the index expression, and the other type of exception can result from accessing an out-of-bounds array element.

At step 235, at the local side, invoke the generated function so that only the intended subset of array elements (i.e., those portions of the array that are to be used at the remote places) are serialized.

At step 240, at the remote side, invoke the generated function so that only the actually used elements are deserialized. In this way, only the array portions that are used at the remote place(s) are deserialized.

FIG. 3 shows exemplary code 300 to be processed in accordance with method 200 of FIG. 2, in accordance with an embodiment of the present principles. The code 300 is written in the X10 programming language. The code in block 310 is code for an array defined outside of the at code block that is used inside of the at code block. The term "particles" is the array name and three variables are used to access the elements of this array, namely "SIZE", "pl.id", and "i". The variable SIZE is defined outside of the at code block and the value of SIZE is determined at runtime of this program. The variable pl.id is an ID of each place in X10, and the value of ID is also determined at runtime. The variable i is a local variable of the loop, and starts from zero and goes up to SIZE-1. Block 320 represents another code for an array defined outside of the at code block that is used inside of the at code block. It is possible that one at code block includes several calculations using different arrays that are defined outside of the at code block.

FIG. 4 shows a compiled version 400 of the exemplary code 300 of FIG. 3, in accordance with an embodiment of the present principles. The compiled version 400 is compiled using an X10 compiler. The at code block in X10 is converted to the function invocation to the runAt in C++ code. The local place invokes the function named serialize_sparse to serialize just the necessary array elements before invoking the function runAt. The remote place(s) invokes the function named deserialize_sparse to deserialize just the necessary array elements before invoking the function runAt.

Figure 5:
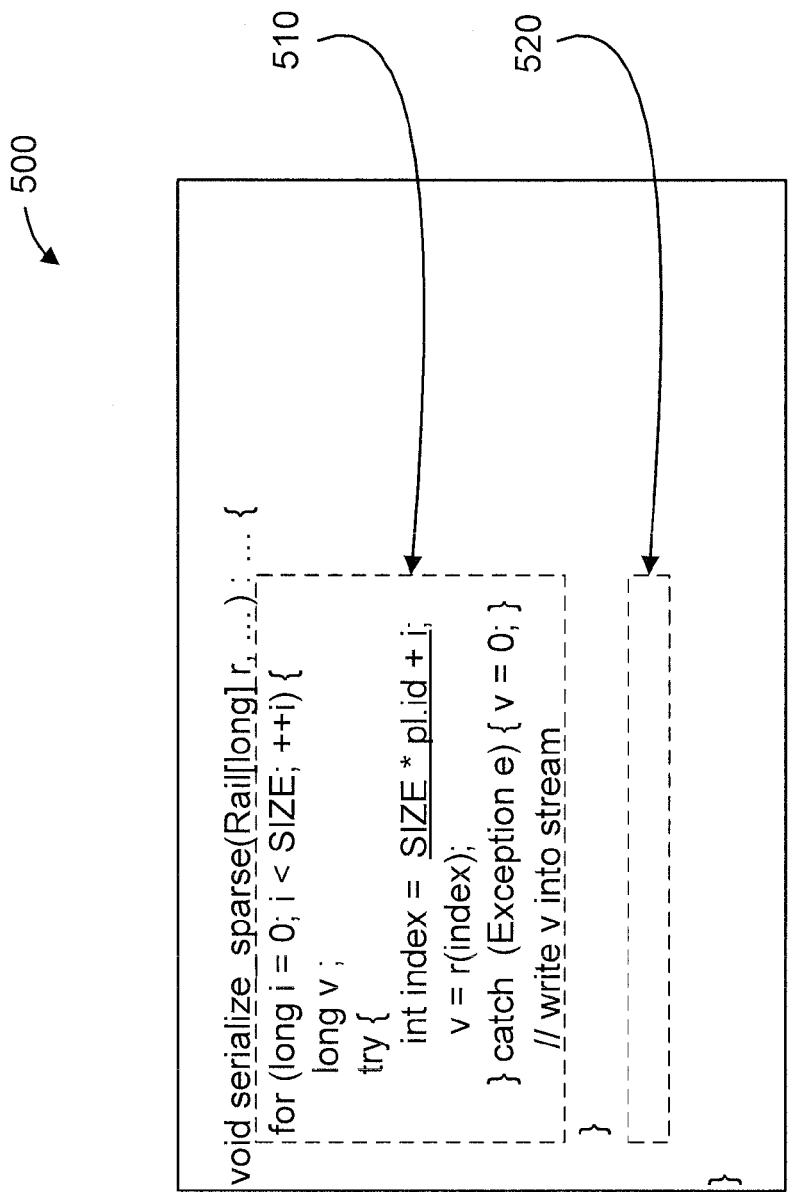
FIG. 5 shows exemplary code 500 at the local side after processing in accordance with method 200 of FIG. 2, in accordance with an embodiment of the present principles.

FIG. 5 shows exemplary code 500 at the local side after processing in accordance with method 200 of FIG. 2, in accordance with an embodiment of the present principles. Block 510 represents generated code by the X10 compiler to serialize just the necessary elements of the array at the local place. The index calculation accessing the array elements was the same as that in block 310 of FIG. 3. At each time of an element read, the element is written into the stream to be copied to the remote place(s). Since any exception cannot occur during the original serialization procedure, we have to guarantee that our approach is not terminated because of an exception during the serialization procedure. In order to realize this feature, the try-catch block is used for the element access of the array to keep continuing the serialization even if an exception is thrown. Block 520 represents another code for the serialization that is generated by the X10 compiler for the code 320 in FIG. 3.

Figure 6:
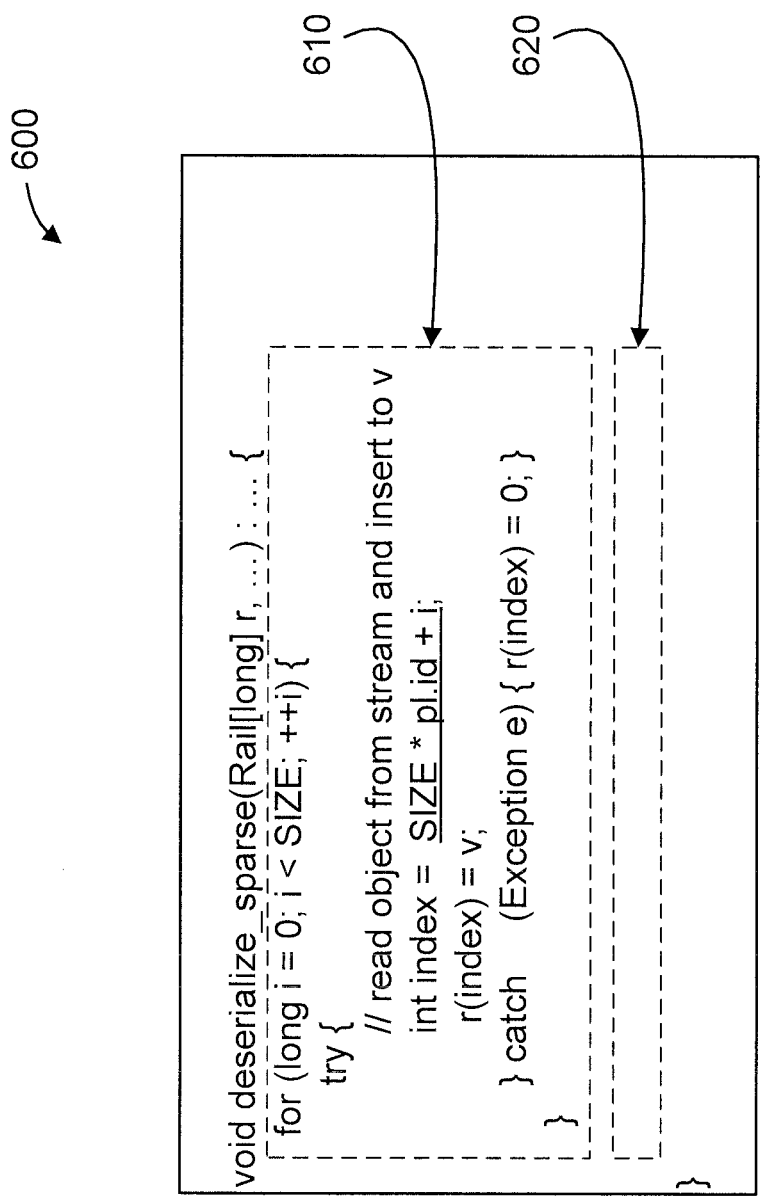
FIG. 6 shows exemplary code 600 at the remote side after processing in accordance with method 200 of FIG. 2, in accordance with an embodiment of the present principles.

FIG. 6 shows exemplary code 600 at the remote side after processing in accordance with method 200 of FIG. 2, in accordance with an embodiment of the present principles. Block 610 represents generated code by the X10 compiler to deserialize just the necessary elements of the array at the remote place. The index calculation accessing the array elements was the same as that in 310 of FIG. 3. After reading an object from the output stream, the object is inserted into the calculated index "SIZE*pl.id+i". Since any exception cannot occur during the original deserialization procedure, we have to ensure that our approach is not terminated because of an exception during the deserialization procedure. In order to realize this feature, the try-catch block is used for the element access of the array to keep continuing the deserialization even if an exception is thrown. Block 620 represents another code for the deserialization that is generated by the X10 compiler for the code 320 in FIG.3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of copying, from a local place to a remote place in a Partitioned Global Address Space language model, only array variables from a set at the local place that are used at the remote place, the method comprising:

identifying the array based on the array meeting a condition of being defined outside of a code block for a copy command and used inside of the code block for the copy command, the copy command mandating a copying of all the array variables in the set from the local place to the remote place;

generating a function having code that selectively serializes or deserializes only the array variables from the set that are used at the remote place;

serializing, at the local place, only the array variables from the set that are used at the remote place, by invoking the generated function; and deserializing, at the remote place, only the array variables from the set that are used at the remote place, by invoking the generated function.

2. The method of claim 1, wherein said serializing and deserializing steps exclude remaining array variables in the set that are unused at the remote place.

3. The method of claim 1, further comprising:
calculating index expressions for each of the array variables at the local place and each of the same named array variables at the remote place;
determining whether the index expressions calculated with respect to the local place match the index expressions calculated with respect to the remote place; and
adjusting one or more index expressions at the local place when one or more respective index expression mismatches exists.

4. The method of claim 3, further comprising determining if any of the array variables at the local place are side-effect free, and adjusting the index expression of the determined array variables when a side-effect exists.

5. The method of claim 4, wherein a given array variable is side-effect free when there is no input operation or output operation for the given variable.

6. The method of claim 4, wherein a given array variable is side-effect free when the given array variable is declared as a field and there is no store operation to the given array variable.

7. The method of claim 3, wherein said adjusting step comprises a converting a term used to bound a variable to a place at which a current computation is running, to a corresponding identifier for the remote place.

8. The method of claim 3, wherein said adjusting step comprises surrounding a given one of the index expressions with an exception handling statement.

9. A computer program product for copying, from a local place to a remote place in a Partitioned Global Address Space language model, only array variables from a set at the local place that are used at the remote place, the computer program product comprising a non-transitory computer readable storage medium having program instructions embodied therewith, the program instructions executable by a computer to cause the computer to perform a method comprising:
identifying the array based on the array meeting a condition of being defined outside of a code block for a copy command and used inside of the code block for the copy command, the copy command mandating a copying of all the array variables in the set from the local place to the remote place;
generating a function having code that selectively serializes or deserializes only the array variables from the set that are used at the remote place;
serializing, at the local place, only the array variables from the set that are used at the remote place, by invoking the generated function; and
deserializing, at the remote place, only the array variables from the set that are used at the remote place, by invoking the generated function.

10. The computer program product of claim 9, wherein said serializing and deserializing steps exclude remaining array variables in the set that are unused at the remote place.

11. The computer program product of claim 9, further comprising:
calculating index expressions for each of the array variables at the local place and each of the same named array variables at the remote place;
determining whether the index expressions calculated with respect to the local place match the index expressions calculated with respect to the remote place; and
adjusting one or more index expressions at the local place when one or more respective index expression mismatches exists.

12. The computer program product of claim 11, further comprising determining if any of the array variables at the local place are side-effect free, and adjusting the index expression of the determined array variables when a side-effect exists.

13. The computer program product of claim 12, wherein a given array variable is side-effect free when there is no input operation or output operation for the given variable.

14. The computer program product of claim 12, wherein a given array variable is side-effect free when the given array variable is declared as a field and there is no store operation to the given array variable.

15. The computer program product of claim 11, wherein said adjusting step comprises a converting a term used to bound a variable to a place at which a current computation is running, to a corresponding identifier for the remote place.

16. The computer program product of claim 11, wherein said adjusting step comprises surrounding a given one of the index expressions with an exception handling statement.

17. A method of copying, from a local place to a remote place in a Partitioned Global Address Space language model, only array variables from a set at the local place that are used at the remote place, the method comprising:
identifying the array based on the array meeting a condition of being defined outside of a code block for a copy command and used inside of the code block for the copy command, the copy command mandating a copying of all the array variables in the set from the local place to the remote place;
for each of the array variables, extracting index expressions therefor, and generating a function having code that modularizes the index expressions and serializes and deserializes the array variables;
obtaining a list that includes the array variables that are copied by the code block for the copy command;
checking that each of the array variables used in the index expressions is included in the list or is side-effect free;
rewriting the index expression to align with remote place contexts responsive to each of the arrays variables used in the index expressions being included in the list or being side-effect free;
serializing, at the local place, only the array variables from the set that are used at the remote place, by invoking the generated function; and
deserializing, at the remote place, only the array variables from the set that are used at the remote place, by invoking the generated function.

18. The method of claim 17, wherein said serializing and deserializing steps exclude remaining array variables in the set that are unused at the remote place.

19. The method of claim 17, wherein a given array variable is side-effect free when there is no input operation or output operation for the given variable or when the given array variable is declared as a field and there is no store operation to the given array variable.

20. The method of claim 17, wherein said rewriting step comprises at least one of:
converting a term used to bound a variable to a place at which a current computation is running, to a corresponding identifier for the remote place; and
surrounding a given one of the index expressions with an exception handling statement.

* * * * *